US012565824B2

(12) United States Patent
Duncan

(10) Patent No.: US 12,565,824 B2
(45) Date of Patent: Mar. 3, 2026

(54) INTEGRATED CARBON SEQUESTRATION INJECTION CONTROL SYSTEM

(71) Applicant: FMC Technologies, Inc., Houston, TX (US)

(72) Inventor: Iain Duncan, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 282 days.

(21) Appl. No.: 18/191,678

(22) Filed: Mar. 28, 2023

(65) Prior Publication Data

US 2024/0328283 A1     Oct. 3, 2024

(51) Int. Cl.
| | |
|---|---|
| *E21B 41/00* | (2006.01) |
| *E21B 47/06* | (2012.01) |
| *E21B 47/135* | (2012.01) |
| *G01K 11/32* | (2021.01) |
| *G01L 11/02* | (2006.01) |

(52) U.S. Cl.
CPC .......... *E21B 41/0064* (2013.01); *E21B 47/06* (2013.01); *E21B 47/135* (2020.05); *G01K 11/32* (2013.01); *G01L 11/025* (2013.01)

(58) Field of Classification Search
CPC ..... E21B 41/0064; E21B 47/06; E21B 47/135
See application file for complete search history.

(56) References Cited

U.S. PATENT DOCUMENTS

| | | | | |
|---|---|---|---|---|
| 7,946,341 B2 * | 5/2011 | Hartog | .................. | E21B 47/135 |
| | | | | 340/854.6 |
| 8,225,867 B2 * | 7/2012 | Hartog | ................ | E21B 41/0064 |
| | | | | 340/854.6 |

| | | | | |
|---|---|---|---|---|
| 8,936,074 B2 | 1/2015 | Kim et al. | | |
| 9,074,456 B2 | 7/2015 | Kim et al. | | |
| 9,926,780 B2 | 3/2018 | Zeng et al. | | |
| 11,199,088 B2 * | 12/2021 | Wilson | ................. | G01V 11/002 |
| 12,140,001 B2 * | 11/2024 | Haukelidsærer Eidesen | ............... | |
| | | | | B63B 22/026 |
| 2012/0155508 A1 | 6/2012 | Dria et al. | | |
| 2012/0277995 A1 | 11/2012 | Hartog et al. | | |
| 2019/0145249 A1 | 5/2019 | Provenzano | | |
| 2022/0236445 A1 | 7/2022 | Davies | | |
| 2023/0052444 A1 | 2/2023 | Wilson et al. | | |

(Continued)

FOREIGN PATENT DOCUMENTS

| | | |
|---|---|---|
| CN | 116255120 A | 6/2023 |
| WO | 2020101688 | 5/2020 |
| WO | 2023073426 | 5/2023 |

OTHER PUBLICATIONS

PCT Patent Application PCT/US2024/017592 International Search Report and Written Opinion of the International Searching Authority issued May 24, 2024.

(Continued)

*Primary Examiner* — Frederick L Lagman
(74) *Attorney, Agent, or Firm* — Erise IP, P.A.

(57) ABSTRACT

Systems and methods for an integrated control system of a carbon sequestration injection system. The integrated control system receives information from fiber-optic sensing elements disposed within a sub-surface portion of the injection system such that operation of the surface injection equipment is automatically adjusted in real-time based on sub-surface parameters detected by the fiber-optic sensing elements.

20 Claims, 7 Drawing Sheets

(56) References Cited

U.S. PATENT DOCUMENTS

2024/0328283 A1 * 10/2024 Duncan ................. E21B 43/164
2025/0003314 A1 * 1/2025 Hasan ...................... G01V 1/40

OTHER PUBLICATIONS

Tiwari Pankaj Kumar et al: "Monitoring, Measurement and Verifi-
cation MMV: A Critical Component in Making the CO2 Seques-
tration Success", Mar. 16, 2021.
"Making real-time fracture insight more affordable and routine",
Halliburton, 2023, https://www.halliburton.com/en/completions/
stimulation/fracture-monitoring/real-time-analytics.

* cited by examiner

600

RECEIVE PRESSURE THRESHOLD — 602

RECEIVE FIBER-OPTIC SIGNAL — 604

CONVERT SIGNAL — 606

DETERMINE ABSORPTION RATE — 608

THRESHOLD EXCEEDED ? — 610

NO

YES

UPDATE INJECTION CONTROL — 612

STORE INFORMATION — 614

INTEGRATED CARBON SEQUESTRATION INJECTION CONTROL SYSTEM

BACKGROUND

1. Field

Embodiments of the invention relate to geological carbon sequestration. More specifically, embodiments of the invention relate to the control of injection systems for geological carbon sequestration.

2. Related Art

Fluid injection systems are used to sequester various fluids into underground reservoirs. Some injection systems have been used for carbon sequestration such as, enhanced oil recovery, short duration sequestration trials, and extended field disposal. However, carbon dioxide behaves fundamentally differently to other injected fluids and is, therefore, difficult to fully model. Further, carbon dioxide injection systems are not typically operated for a continuous period of time. Specifically, it is desirable to avoid over-pressurization of the reservoir or confining shale and to avoid pressure spikes, both of which may induce undesirable cracking of the reservoir or containment formation. Existing carbon injection systems completely halt injection operation when the pressure spikes are detected and wait for pressure stabilization before resuming operation, which can be an extremely time-consuming process (e.g., hours to even days to obtain stabilization of the pressure in a reservoir responsive to the injected carbon dioxide). The significant need to avoid pressure spikes and over-pressurization results in wasted processing time, i.e., a large amount of downtime, over which no carbon is sequestered, and presents a tremendous cost associated with sequestration services.

SUMMARY

Embodiments of the invention solve the above-mentioned problems by providing an integrated injection control system to automatically update control of carbon sequestration injection systems based on a fiber-optic signal received from at least one sensor disposed in a sub-surface portion of the injection system, adjacent to the injection zone or zones.

In some aspects, the techniques described herein relate to an injection system for automatically controlling a carbon dioxide injection process, the injection system including: a surface portion disposed above-ground including: a control system that controls operation of one or more injection devices; and a sub-surface portion configured to be disposed underground and interfaced with a geological sequestration reservoir such that carbon dioxide is pumped from the surface portion into the geological sequestration reservoir, the sub-surface portion including: injection tubing; a plurality of ported connections disposed at a respective plurality of predetermined locations on the injection tubing; and a fiber-optic system including: a fiber-optic interrogator coupled to the control system; a plurality of fiber-optic sensors disposed at one or more of the plurality of ported connections, the plurality of fiber-optic sensors configured to respectively measure a plurality of parameters including an internal pressure and internal temperature of the injection tubing; and one or more fiber-optic cables that transmit at least one signal indicative of the plurality of parameters in real-time to the fiber-optic interrogator, wherein control of the one or more injection devices by the control system is automatically updated in real-time based on the at least one signal such that a continuous flow of the carbon dioxide into the geological sequestration reservoir is maintained.

In some aspects, the techniques described herein relate to an injection system, wherein data indicative of the plurality of parameters is stored in an onsite data store in a vicinity of the injection system and a remote data store.

In some aspects, the techniques described herein relate to an injection system, wherein at least one of the plurality of fiber-optic sensors is clamped to the injection tubing within an annulus cavity.

In some aspects, the techniques described herein relate to an injection system, wherein the control system determines an estimated absorption rate of the geological sequestration reservoir based on the at least one signal and further updates control of the one or more injection devices based on the estimated absorption rate of the geological sequestration reservoir.

In some aspects, the techniques described herein relate to an injection system, wherein automatically updating control of the one or more injection devices is further based on a predefined pressure threshold associated with the geological sequestration reservoir.

In some aspects, the techniques described herein relate to an injection system, wherein a power level of the one or more injection devices is reduced responsive to determining that the internal pressure exceeds the predefined pressure threshold.

In some aspects, the techniques described herein relate to an injection system, wherein the control system includes an integrated control system directly coupled to the fiber-optic system, and wherein the fiber-optic interrogator is directly coupled to the integrated control system.

In some aspects, the techniques described herein relate to a fiber-optic system for automatically controlling a carbon dioxide injection process of an injection system, the fiber-optic system including: a fiber-optic interrogator coupled to a control system of the injection system; a plurality of fiber-optic sensors disposed on injection tubing of the injection system, the plurality of fiber-optic sensors configured to respectively measure a plurality of parameters including an internal pressure and internal temperature of the injection tubing of the injection system; and one or more fiber-optic cables that transmit at least one signal indicative of the plurality of parameters in real-time to the fiber-optic interrogator, wherein control of one or more injection devices of the injection system by the control system is automatically updated in real-time based on the at least one signal such that a continuous flow of carbon dioxide into a geological sequestration reservoir is maintained.

In some aspects, the techniques described herein relate to a fiber-optic system, wherein the fiber-optic interrogator is disposed at a surface portion of the injection system, and wherein the plurality of fiber-optic sensors and the one or more fiber-optic cables are disposed at a sub-surface portion of the injection system.

In some aspects, the techniques described herein relate to a fiber-optic system, wherein the plurality of fiber-optic sensors are disposed at one or more of a plurality of ported connections of the injection tubing.

In some aspects, the techniques described herein relate to a fiber-optic system, wherein the plurality of fiber-optic sensors includes: a first fiber-optic sensor disposed on the injection tubing adjacent to a bottom portion of a wellhead of the injection system; a second fiber-optic sensor disposed on the injection tubing at a mid-section of the injection tubing; a third fiber-optic sensor disposed on the injection tubing adjacent to an injection packer of the injection system; and a fourth fiber-optic sensor disposed on the injection tubing adjacent to an injection zone within the injection system.

In some aspects, the techniques described herein relate to a fiber-optic system, wherein the plurality of fiber-optic sensors further includes: a fifth fiber-optic sensor disposed on the injection tubing within an annulus cavity of the injection system.

In some aspects, the techniques described herein relate to a fiber-optic system, wherein at least one fiber-optic sensor of the plurality of fiber-optic sensors is configured to detect seismic signals associated with the geological sequestration reservoir over a depth of the injection tubing.

In some aspects, the techniques described herein relate to a fiber-optic system, wherein the fiber-optic interrogator is directly coupled to the control system.

In some aspects, the techniques described herein relate to a fiber-optic system, wherein the one or more fiber-optic cables detects an internal temperature of the injection tubing across a length of the one or more fiber-optic cables using a Distributed Temperature Sensing (DTS) technique.

In some aspects, the techniques described herein relate to one or more non-transitory computer-readable media that store computer-readable instructions that, when executed by at least one processor, perform a method of continuous carbon dioxide sequestration into a geological sequestration reservoir using an injection system, the method including: receiving a predetermined pressure threshold associated with the geological sequestration reservoir; receiving a signal collected by a fiber-optic system disposed at a sub-surface portion of the injection system, the signal including information indicative of an internal pressure of the injection system; determining whether the internal pressure exceeds the predetermined pressure threshold associated with the geological sequestration reservoir; responsive to determining that the internal pressure exceeds the predetermined pressure threshold, automatically updating, in real-time, a control system of the injection system to reduce a flow rate of carbon dioxide within the injection system; and storing the information indicative of the internal pressure in at least one data store.

In some aspects, the techniques described herein relate to one or more non-transitory computer-readable media, the method further including: determining an absorption rate of the geological sequestration reservoir based at least in part on the information indicative of the internal pressure of the injection system.

In some aspects, the techniques described herein relate to one or more non-transitory computer-readable media, the method further including: receiving a subsequent signal collected by a fiber-optic system disposed at a sub-surface portion of the injection system, the subsequent signal including information indicative of an internal temperature of the injection system.

In some aspects, the techniques described herein relate to one or more non-transitory computer-readable media, wherein the control system of the injection system is further updated based at least in part on the information indicative of the internal temperature of the injection system.

In some aspects, the techniques described herein relate to one or more non-transitory computer-readable media, the method further including: receiving a subsequent signal from a sensor disposed at a surface portion of the injection system, the subsequent signal including information indicative of a surface pressure of the injection system; and comparing internal pressure of the injection system to the surface pressure of the injection system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
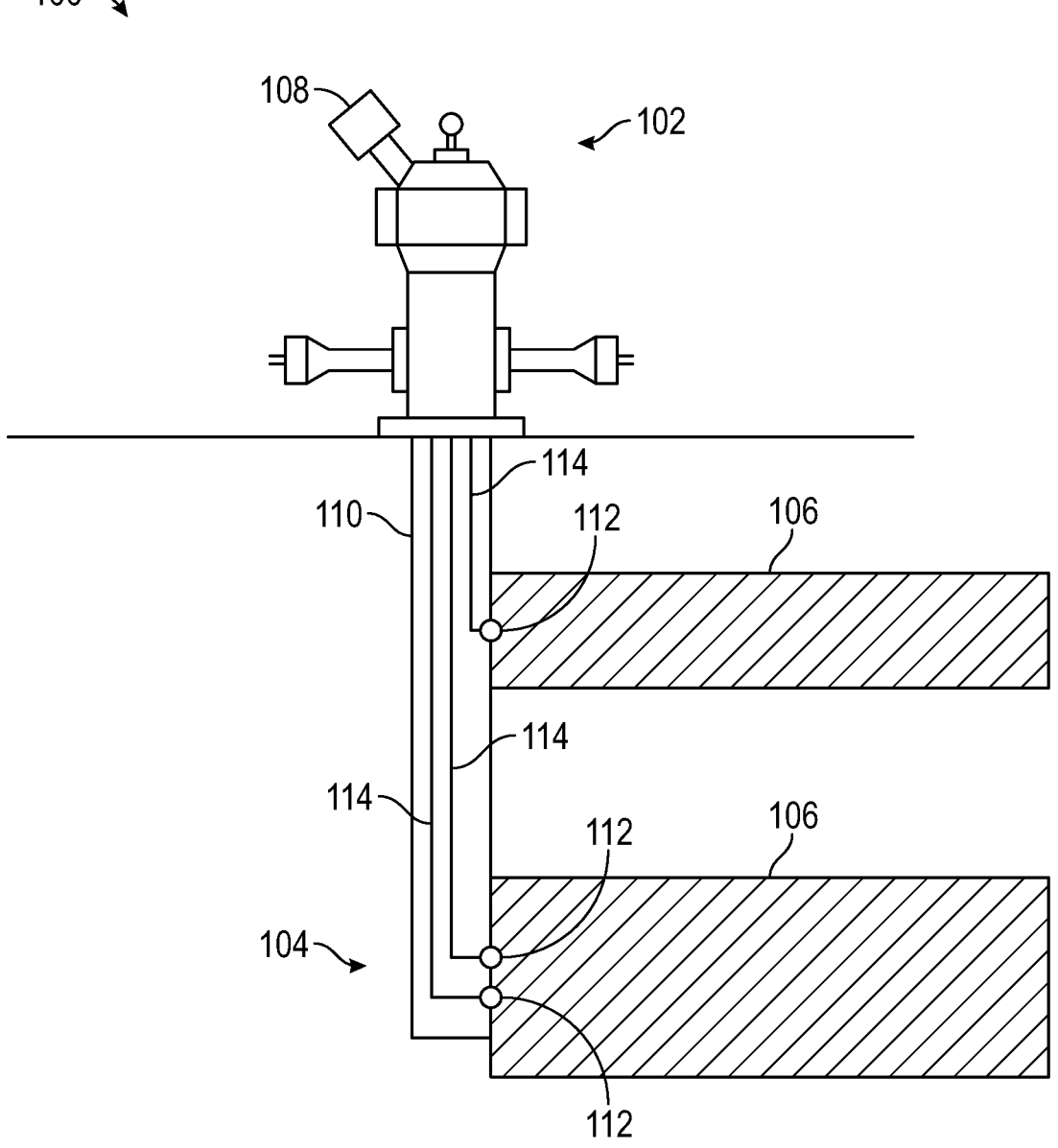
FIG. 1 illustrates an exemplary injection system diagram relating to some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

The following discussion of FIG. 1 provides a broad overview of embodiments of the present disclosure. FIG. 1 illustrates an exemplary injection system diagram relating to some embodiments of the present disclosure and referred to generally by reference numeral 100. The injection system 100 may include a surface portion 102 disposed above-ground and a sub-surface portion 104 disposed underground that interfaces with a sequestration reservoir 106, as shown. In some embodiments, the sequestration reservoir 106 is a naturally occurring geological formation such as any of a depleted (or active) oil and gas reservoirs, saline formations, or coal beds, as well as other suitable geological formations. In some embodiments, man-made and partially man-made structures are also contemplated as potential sequestration reservoirs. In some embodiments, a number of separate sequestration reservoirs 106 may be present, as shown. For example, a plurality of sequestration reservoirs 106 are located at different levels of depth within the ground.

In some embodiments, the surface portion 102 includes a wellhead (further described with respect to FIG. 3) with a control system configured to control operation of any of one or more pumps or compressors, valves, and other devices of the surface portion 102, as will be described in further detail below. Further, in some embodiments, the surface portion 102 includes a fiber-optic interrogator 108 configured to read one or more fiber-optic signals received from the sub-surface portion 104.

The sub-surface portion 104 comprises injection tubing 110 disposed vertically into the ground to fluidly connect the surface portion 102 to the one or more sequestration reservoirs 106. Accordingly, the injection tubing 110 includes one or more injection tubes protruding into the depth of the sub-surface portion 104 such that carbon dioxide fluid may be pumped into one of the sequestration reservoirs 106 during operation. The carbon dioxide fluid may be maintained at a dense or supercritical state that is above the critical temperature and critical pressure of carbon dioxide such that the carbon dioxide has properties of both a gas and a liquid. Specifically, in the supercritical state, the carbon dioxide expands to fill its container like a gas but has a density similar to a liquid state. The supercritical state may be preferred due to having relatively stable parameters and the suitability to be pumped, which is useful for injection.

The sub-surface portion 104 further comprises one or more fiber-optic sensors 112 disposed, for example, at an end of the injection tubing adjacent to an entrance of the sequestration reservoir 106 to collect data associated with the injection tubing 110 and the sequestration reservoir 106. Accordingly, signals collected by the fiber-optic sensors 112 may be transmitted to the fiber-optic interrogator 108 via one or more respective fiber-optic cables 114, as shown. In some embodiments, the fiber-optic sensors 112 are configured to measure one or more parameters associated with the injection tubing and sequestration reservoir 106, such as any of an injection pressure, injection temperature, injection flowrate, or the like.

In some embodiments, the fiber-optic sensors 112 and fiber-optic cables 114 may be operable to provide one of, or any combination of, Distributed Temperature Sensing (DTS), Distributed Acoustic Sensing (DAS), and Vertical Seismic Profiling (VSP) for the injection system 100. For example, DTS techniques may be used to measure temperature across a length of the one or more fiber-optic cables 114 such that the fiber-optic cables 114 act as a sensing element to measure temperature across a length of the one or more respective fiber-optic cables 114. DAS techniques may be used to detect acoustic events across a length of a respective fiber-optic cable. VSP techniques may be used to generate and develop a vertical seismic profile based on signals collected using the fiber-optic cables 114.

In some embodiments, the sequestration reservoirs 106 may be used one at a time. For example, a first reservoir at a lower depth may be used initially to sequester carbon dioxide and then capped off to seal the first reservoir. Subsequently, operation may be shifted to a second sequestration reservoir at a higher depth than the first reservoir and sequestration continued at the second sequestration reservoir.

Figure 2A:
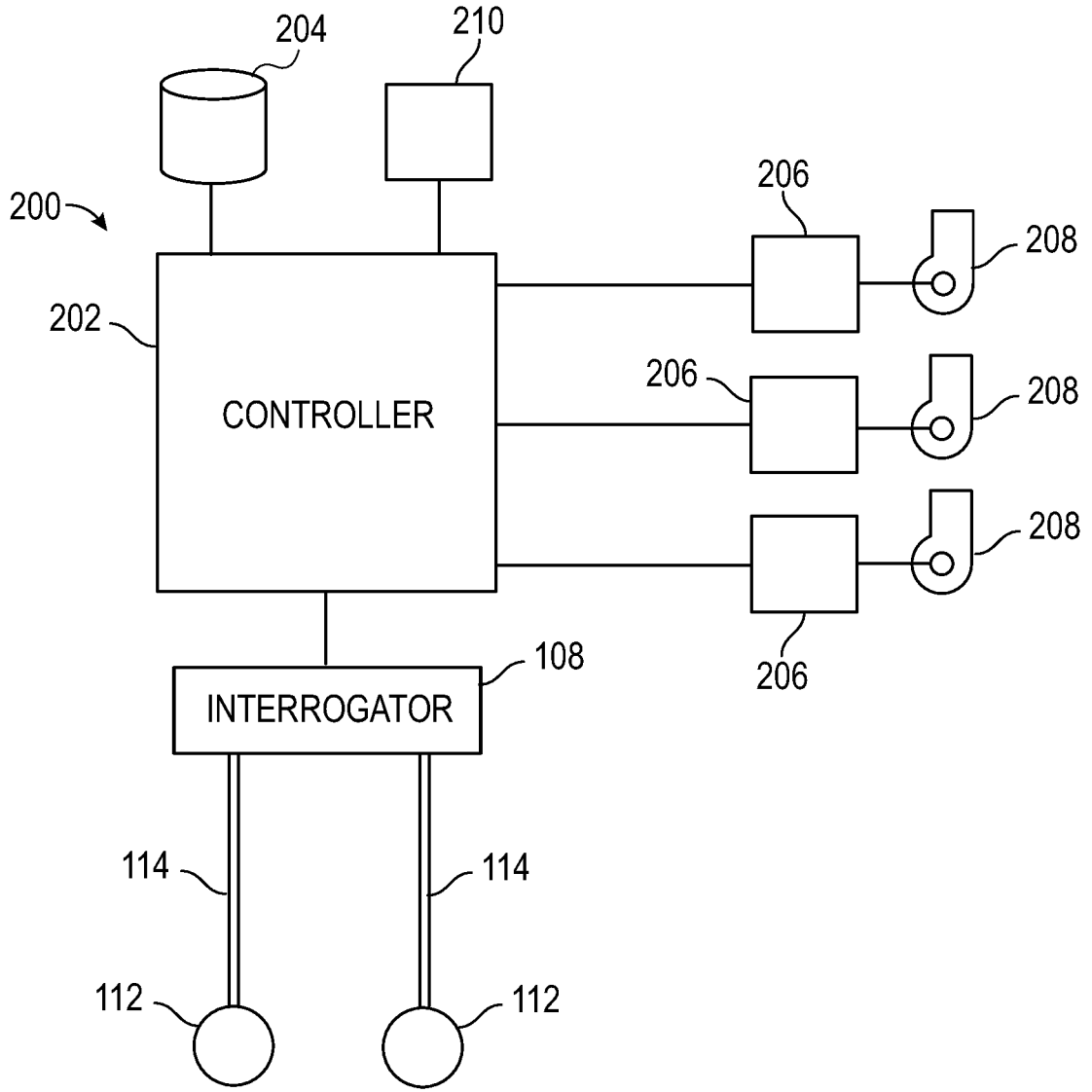
FIG. 2A illustrates an exemplary control diagram relating to some embodiments.

FIG. 2A illustrates an exemplary control diagram relating to some embodiments and referred to generally by reference numeral 200 herein. A controller 202 may be included for controlling operation of the injection system 100. In some embodiments, the controller 202 comprises at least one processor for processing information and facilitating operations of the controller 202. For example, the at least one processor may be programmed to perform any operational step described herein. In some embodiments, the controller 202 may be communicatively coupled to at least one storage element 204, as shown. Accordingly, the storage element may be configured to store computer readable instructions to be carried out by the at least one processor of the controller 202. Further, in some embodiments, the storage element 204 may be used to store data associated with the injection system 100 and known and/or collected data associated with the operating environment of the injection system 100. The storage element 204 may include any suitable form of computer-readable media, as described herein. In some embodiments, one or more storage elements may be included for storing data collected by the control system 200. For example, a local data store may be included onsite in a vicinity to the injection system to locally store injection parameters and other data associated with the injection system 100 and sequestration reservoir 106. Additionally, or alternatively, a remote data store may be included such that any of the above-mentioned forms of data may be monitored and stored remotely and/or redundantly.

In some embodiments, the control system 200 is an integrated control system that is directly integrated into the injection system 100. For example, the integrated control system is integrated into both of the injection system 100 and the fiber-optic sensing system such that control to the injection system 100 is provided locally in real-time based on signals from the fiber-optic sensing system. Such a form of direct integration allows minimal lag communication to be carried out between the integrated control system, the fiber-optic sensing system, and the injection system 100 without using remotely transmitted control signals. It should be understood that embodiments are contemplated in which remote communication may take place, for example, over a network. However, control of the injection system 100 may be handled locally via the integrated control system, as described herein.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

In some embodiments, one or more non-transitory computer-readable media are included for executing a method of carbon dioxide using an injection system. For example, the one or more non-transitory computer-readable media may be executed using at least one processor, such as a processor of the controller 202. In some such embodiments, the computer-readable media may be configured to provide a number of steps such as the steps of method 600 as described in further detail below.

In some embodiments, the controller 202 may be communicatively coupled to one or more injector controllers 206 operable to control operation of a respective injection device, such as, for example, injector pump or compressor 208, as shown. Additionally, in some embodiments, one or more injection devices comprises any combination of injector pumps, injector compressors, valves, manifolds, flowmeters, wellheads, and trees. Here, each injector pump or compressor 208 may be configured to pump or compress carbon dioxide into the sub-surface portion 104 of the injection system 100. For example, the injector pumps 208 may be disposed at the surface portion 102 such that the carbon dioxide fluid may be pumped downwards at an injection zone into the sequestration reservoir 106.

In some embodiments, one or more fiber-optic sensors 112 may be coupled to the controller 202 via one or more fiber-optic cables 114, as shown. The fiber-optic sensors 112 may be configured to collect data associated with the injection system 100 at the injection zone of the sequestration reservoir 106. In some embodiments, the signals collected by the fiber-optic sensors 112 are transmitted to the fiber-optic interrogator 108, which may convert or translate the received signals into a form suitable for processing by the controller 202. Accordingly, embodiments are contemplated in which the fiber-optic interrogator 108 is communicatively coupled to the controller 202. Alternatively, or additionally, the fiber-optic interrogator 108 may be directly coupled to the controller 202 or at least a portion of the control system 200, for example, via a direct wired connection. As such, lag associated with wirelessly transferring signals is alleviated via the direct communication coupling of the fiber-optic interrogator 108 and the control system 200, thereby permitting real-time communication and control of the injection system 100 based on signals from the fiber-optic portion of the control system 200.

Embodiments are contemplated in which the controller 202 may adjust operation of the one or more pumps or compressors 208 based at least in part on information indicative of at least one operation parameter provided by signals collected by the fiber-optic sensors 112. For example, one of the fiber-optic sensors 112 may be configured to measure the operation parameter of a pressure associated with the injection system 100, such as, a pressure of the injection tubing 110 at or near the injection zone. A signal including information indicative of the measured pressure may be transmitted via the fiber-optic cable 114 to the fiber-optic interrogator 108, which communicates the information indicative of the measured pressure to the controller 202. Accordingly, the controller 202 adjusts operation of the one or more pumps 208 and/or compressors by instructing the injection controllers 206 based on the information indicative of the measured pressure. In some cases, the controller 202 may instruct the injection controllers 206, for example, to reduce an injection rate based on detecting a relatively high pressure near the injection zone. The fiber-optic cable 114 allows the signal including information indicative of the pressure (and/or other parameters) near the injection zone to be transmitted immediately to the controller 202 at the surface portion 102 of the injection system 100. In some embodiments, the fiber-optic cable 114 transmits the signal at relatively high speed compared to other forms of data communication. For example, signals may travel through the fiber-optic cable 114 at a speed that is equivalent to the speed of light in a vacuum divided by the refractive index of the fiber-optic material. Glass may be used within the fiber-optic cable 114 such that the signals travel at speeds of about 180,000-200,000 km/s. Accordingly, the controller 202 may be updated in real-time via the high-speed fiber-optic signal received from the fiber-optic cable 114.

In some embodiments, a notification device 210 may be included in the control system 200 and coupled to the controller 202. In some such embodiments, the notification device 210 comprises a user interface, alarm, or other form of man-machine interface operable to deliver a notification to an operator. Further, embodiments are contemplated in which the notification device 210 is operable to notify another control system or other automated system. The notification device 210 may be operable to notify one or more operators or other entities of a status of the injection system 100. For example, in some embodiments, the notification device 210 is configured to transmit a notification or alarm based on a determination that an alarm threshold has been exceeded. Here, the alarm threshold may be associated with a parameter of the injection system 100 such as, for example, an internal pressure, internal temperature, flow rate, or any combination thereof. In some embodiments, the alarm may be triggered based on one or more signals received from the fiber-optic sensors 112, fiber-optic cables 114, and the fiber-optic interrogator 108. For example, an alarm may be triggered based on receiving a signal from the fiber-optics system including information indicative of an internal pressure within the injection system 100 that exceeds a predetermined pressure threshold. Similar alarms and thresholds are contemplated for other types of parameters. For example, a high temperature alarm may be triggered based on information indicative of an internal temperature that exceeds a temperature threshold and yet another alarm may be associated with a rate of change of the measured pressure values.

In some embodiments, a plurality of other types of sensors may be included and coupled to the control system 200. For example, one or more electronic sensors, such as electronic pressure sensors and/or electronic temperature sensors, as well as other suitable types of sensors may be disposed at various locations within the injection system 100. Said other sensors may be disposed in either or both of the surface portion 102 and the sub-surface portion 104 of the injection system 100. Embodiments are contemplated in which one or more ambient air sensors and thermo-cameras are included to monitor ambient air quality and temperature at the surface. In some such embodiments, the control system 200 is configured to manage operation of the injection system 100 based further on the one or more electronic sensors. For example, control of the one or more pumps 208 may be adjusted based on a combination of parameters measured by the fiber-optic sensors 112 and other sensors.

Figure 2B:
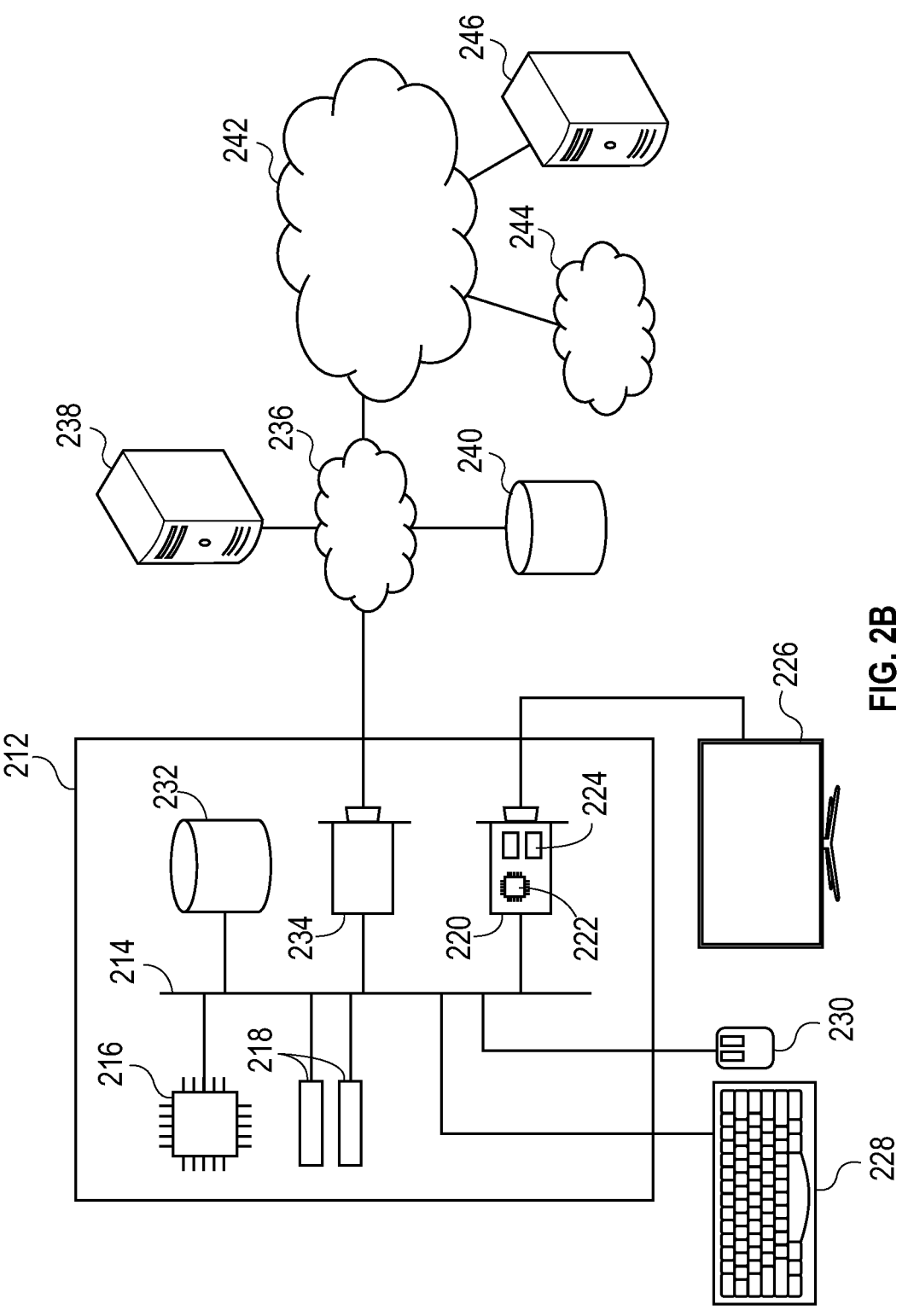
FIG. 2B illustrates an exemplary hardware diagram relating to some embodiments.

FIG. 2B illustrates an exemplary hardware platform for certain embodiments of the invention is depicted. Computer 212 can be a desktop computer, a laptop computer, a server computer, a mobile device such as a smartphone or tablet, or any other form factor of general- or special-purpose computing device. Depicted with computer 212 are several components, for illustrative purposes. In some embodiments, certain components may be arranged differently or absent. Additional components may also be present. Included in computer 212 is system bus 214, whereby other components of computer 212 can communicate with each other. In certain embodiments, there may be multiple busses or components may communicate with each other directly. Connected to system bus 214 is central processing unit (CPU) 216. Also attached to system bus 214 are one or more random-access memory (RAM) modules 218. Also attached to system bus 214 is graphics card 220. In some embodiments, graphics card 220 may not be a physically separate card, but rather may be integrated into the motherboard or the CPU 216. In some embodiments, graphics card 220 has a separate graphics-processing unit (GPU) 222, which can be used for graphics processing or for general purpose computing (GPGPU). Also on graphics card 220 is GPU memory 224. Connected (directly or indirectly) to graphics card 220 is display 226 for user interaction. In some embodiments no display is present, while in others it is integrated into computer 212. Similarly, peripherals such as keyboard 228 and mouse 230 are connected to system bus 214. Like display 226, these peripherals may be integrated into computer 212 or absent. Also connected to system bus 214 is local storage 232, which may be any form of computer-readable media, and may be internally installed in computer 212 or externally and removably attached. The computer 212 may also be a component included within or communicatively associated with the controller 202 and form part of the control system 200.

Such non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 234 is also attached to system bus 214 and allows computer 212 to communicate over a network such as network 236. NIC 234 can be any form of network interface known in the art, such as Ethernet, ATM, fiber, Bluetooth®, or Wi-Fi (i.e., the IEEE 802.11 family of standards). NIC 234 connects computer 212 to local network 236, which may also include one or more other computers, such as computer 238, and network storage, such as data store 240. Generally, a data store such as data store 240 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 238, accessible on a local network such as local network 236, or remotely accessible over Internet 242. Local network 236 is in turn connected to Internet 242, which connects many networks such as local network 236, remote network 244 or directly attached computers such as computer 246. In some embodiments, computer 212 can itself be directly connected to Internet 242.

In some embodiments, the display 226 may be used, for example, to display a user interface for interacting with the injection system 100. For example, a user may receive notifications and updates of the injection system 100 via the display 226 and provide inputs to the computer 212 using the keyboard 228 and mouse 230. Further, the data store 240 may be used to remotely store information collected from the injection system 100 such as information collected by the fiber-optic sensors 112. Embodiments are contemplated in which the computer 212 may be included on or interfaced with the controller 202. For example, in some embodiments, the controller 202 comprises any of the components described with respect to the computer 212.

Figure 3:
FIG. 3 illustrates an exemplary internal view of a surface portion of an injection system relating to some embodiments.

FIG. 3 illustrates an exemplary internal view of the surface portion 102 of the injection system 100 relating to some embodiments. In some embodiments, the surface portion 102 is attached to an upper end of the injection tubing 110, as shown, which may include one or more injection tubes. In some embodiments, the injection tubing 110 includes a plurality of injection tubes that are disposed concentrically within one another, as shown.

The surface portion 102 comprises a housing structure 300, as shown. The housing structure 300 may include a rigid material suitable to maintain a pressure within the injection tubing 110. One or more manual or remote activated valves 302 may be included. The manual or remote activated valves 302 may be disposed onto the housing structure 300. Further, one or more gauges 304 may be included to visually indicate various parameters associated with the injector system 100. For example, the one or more gauges 304 may include a plurality of pressure gauges for displaying pressures of a respective plurality of injection tubes or other portions of the injection system 100. The fiber optical cable exits the wellhead housing structure 300 via the fiber optic connection 307.

In some embodiments, the surface portion 102 further comprises one or more ground support structures 306. The one or more ground support structures 306 may be secured to the housing structure 300. In some embodiments, the ground support structures 306 may support the surface portion 102 and maintain the surface portion 102 in a vertical orientation.

Figure 4:
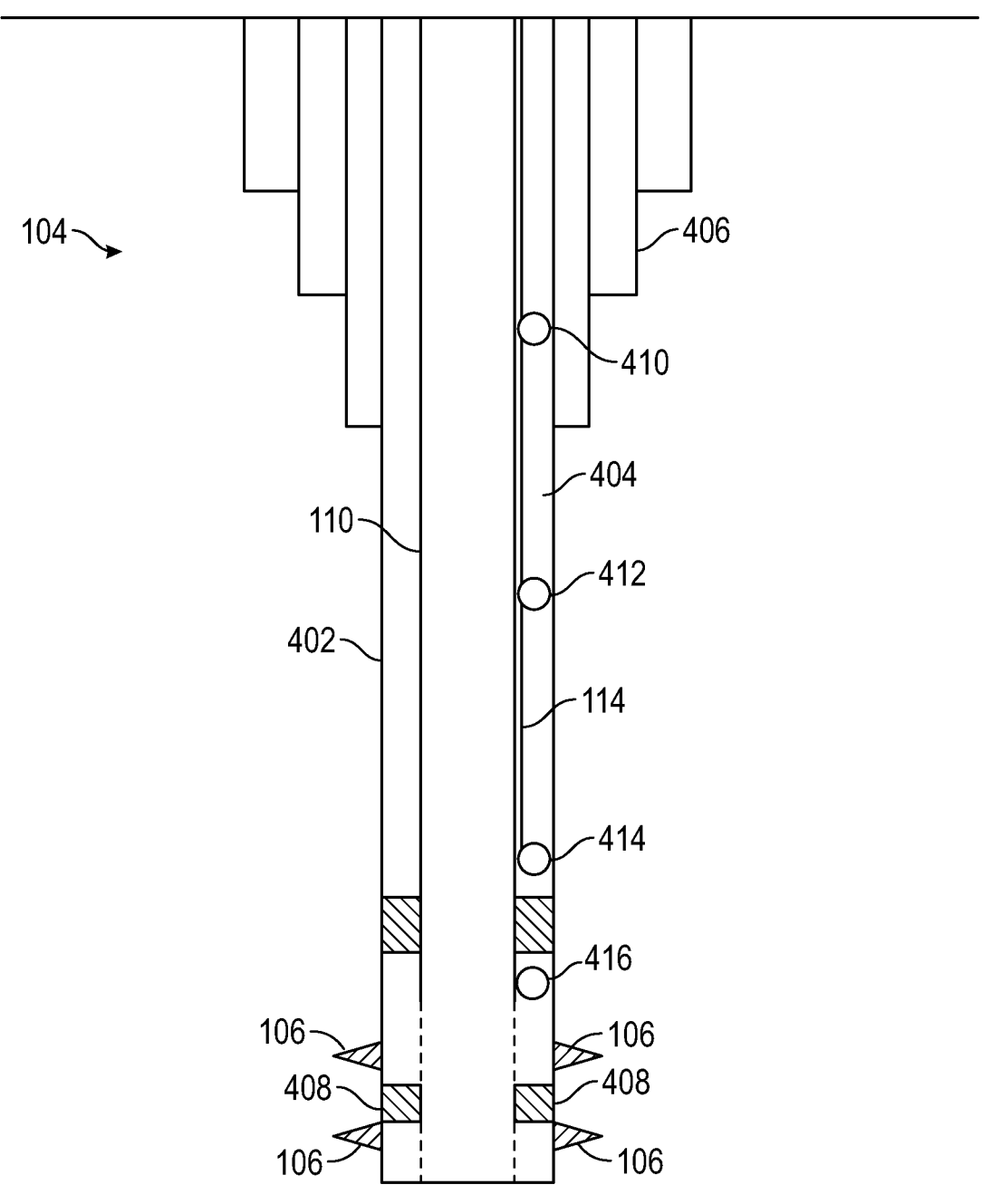
FIG. 4 illustrates an exemplary view of a sub-surface portion relating to some embodiments.

FIG. 4 illustrates an exemplary view of the sub-surface portion 104 relating to some embodiments. The sub-surface portion 104 may include the injection tubing 110, as described above. In some embodiments, the injection tubing 110 is disposed within a rigid casing 402, as shown. In some embodiments, the rigid casing 402 may comprise a high-strength, rigid material such as, steel or another high-strength metal or composite such as concrete. In some embodiments, a spacing may be included between an outer surface of the injection tubing 110 and an inner surface of the rigid casing 402 referred to herein as an annulus cavity 404. In some such embodiments, the annulus cavity 404 may be filled, at least partially, with a brine solution.

In some embodiments, one or more rigid casing layers 406 may be included, as shown. The rigid casing layers 406 may comprise a rigid material such as steel or concrete and may be disposed around an exterior of the rigid casing 402. In some embodiments, the rigid casing 402 and the rigid casing layers 406 may protrude at least partially into the surface portion 102 of the injection system 100.

The sub-surface portion 104 may further include one or more packers 408 operable to release carbon dioxide into the sequestration reservoir 106. In some embodiments, a plurality of packers 408 may be included such that carbon dioxide may be sequestered at a variety of different depths into respective sequestration reservoirs 106.

In some embodiments, a plurality of fiber-optic sensors 112 is included that may be disposed at a respective plurality of predetermined locations on the injection tubing 110. For example, the plurality of fiber-optic sensors may include any of a first fiber-optic sensor 410 disposed proximate to and below the wellhead beneath a bottom portion of the wellhead, a second fiber-optic sensor 412 disposed about half-way down (i.e., at a mid-section) of the injection tubing 110, a third fiber-optic sensor 414 disposed proximate to and above the packer 408, and a fourth fiber-optic sensor 416 disposed adjacently above or below to the packer 408. Further, in some embodiments, at least one fiber-optic sensor may be disposed on the injection tubing adjacent to an injection zone within the injection system. The injection zone may refer to the area within the injection tubing 110 at the level of the packer 408 that releases carbon dioxide into the sequestration reservoir 106. As such, embodiments are contemplated in which there are multiple injection zones at varying levels of depth corresponding to a respective plurality of reservoirs 106. Alternatively, the injection zone may refer to the area at the interface between the injection tubing 110 and the sequestration reservoir 106 where the carbon dioxide enters the reservoir. Additionally, or alternatively, one or more non-fiber-optic sensors may be included. For example, an electronic pressure sensor or other type of sensor may be included.

In some embodiments, one or more of the fiber-optic sensors 410-416 may be disposed on an outer surface of the injection tubing 110 within the annulus cavity 404. For example, the fiber-optic sensors may be clamped to the injection tubing 110 or fastened to the injection tubing 110 in another suitable way. In some embodiments, the fiber-optic sensors may measure parameters associated with the injection tubing 110 or with the annulus cavity 404. For example, one of the fiber-optic sensors may detect an internal pressure of the annulus cavity 404 while another fiber-optic sensor detects an internal pressure of the injection tubing 110.

In some embodiments, at least one of the fiber-optic sensors 410-416 is configured to monitor for pressure spikes generated within the sequestration reservoir 106 such that control of surface injection equipment, such as the one or more pumps or compressors 208, may be adjusted to prevent pressures within the injection system 100 and reservoir from rising beyond safe operating levels. In some embodiments, a safe operating range may be defined using one or more pre-set or predetermined thresholds determined for each individual reservoir based on specific characteristics of the respective reservoir. Here, thresholds may be determined to prevent cracking or fracture of the sequestration reservoir 106. Accordingly, the thresholds may be selected based on a plurality of reservoir-specific parameters such as the type of rock within and surrounding the reservoir, the depth of the reservoir, the distance from a drinking water source, and other reservoir-specific information. In some embodiments, a maximum pressure value may be determined for a given reservoir, for example, based on the reservoir-specific parameters, and one or more thresholds may be selected based on the maximum pressure value to prevent the maximum pressure value from being exceeded and to adjust operation of the injection system 100 as the maximum pressure value is approached. In one example, a first pressure threshold is set within 20% of the maximum pressure value, a second pressure threshold is set within 15% of the maximum pressure value, a third pressure threshold is set within 10% of the maximum pressure value, and a fourth pressure threshold is set within 5% of the maximum pressure value. Accordingly, a number of alarms and control adjustments may be triggered after a measured pressure value exceeds the respective pressure thresholds. For example, if the first pressure threshold is exceeded, the control system 200 may slightly reduce the flow rate of carbon dioxide within the injection system 100, if the second pressure threshold is exceeded, the control system may perform a larger reduction, and so on. Additionally, or alternatively, in some embodiments, in extreme situations, a full-stop adjustment is contemplated. For example, if the fourth pressure threshold is exceeded, the control system 200 may temporarily halt operation of the injection system 100 to prevent the maximum pressure value from being reached. It should be understood that a variety of other types of thresholds are also contemplated such as other percentages of the maximum pressure not explicitly described herein.

Figure 5:
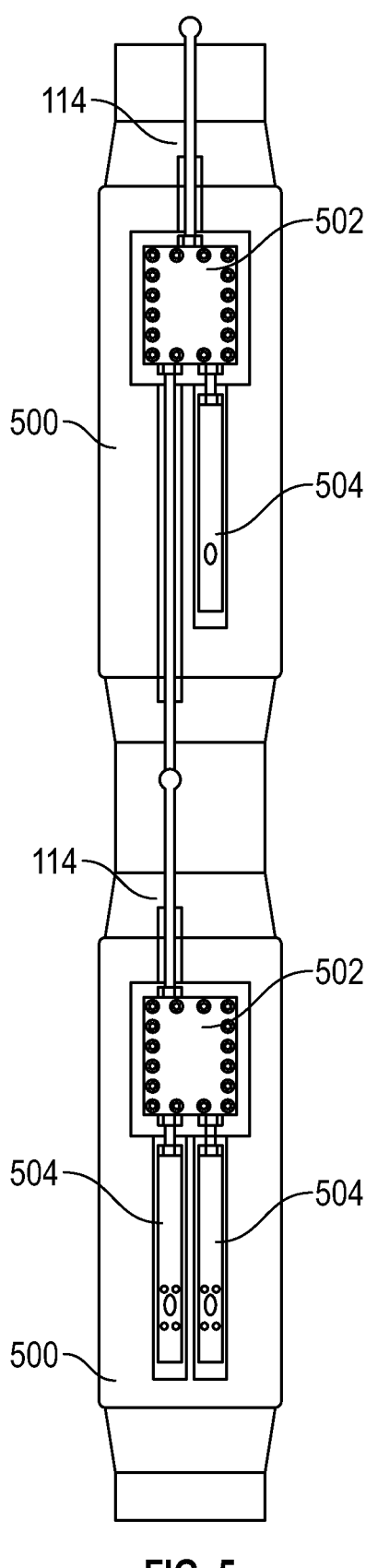
FIG. 5 illustrates exemplary injection tubing relating to some embodiments.

FIG. 5 illustrates exemplary injection tubing 110 relating to some embodiments. In some embodiments, the injection tubing 110 includes one or more carrier mandrels 500. In some embodiments, the fiber-optic cable 114 may be disposed along an outer surface of the injection tubing 110 and the carrier mandrel 500, as shown. One or more splitter housings 502 may be included for splitting one or more portions of the fiber-optic cable 114. For example, one or more portions of the fiber-optic cable 114 may be split off at the splitter housing 502 to measure a pressure or other parameter at a particular depth. As such, pressures and other parameters may be recorded at various different depths of the injection tubing 110 and at various different injection sites.

In some embodiments, one or more fiber-optic ports 504 may be connected to the carrier mandrels 500. The fiber-optic ports 504 may include or be coupled to one or more fiber-optic sensors. Such as the fiber-optic sensors 112. The fiber-optic sensors 112 may include any of a fiber-optic pressure sensor, a fiber-optic temperature sensor, a fiber-optic flow sensor, or another suitable fiber-optic sensor operable to detect one or more parameters associated with the injection system 100. In some embodiments, the fiber-optic ports 504 may be clamped to an exterior surface of the injection tubing 110, as well as the carrier mandrels 500 as shown.

In some embodiments, at least one fiber-optic sensor may be disposed on an outer surface of the injection tubing 110 within the annulus cavity 404. Accordingly, the at least one fiber-optic sensor may be configured to measure one or more respective annulus parameters such as an annulus pressure and an annulus temperature. Accordingly, various parameters within the injection system may be considered to determine one or more control routines of the control system 200. For example, the control system may instruct an adjustment in operation of the one or more pumps or compressors 208 based on any combination of surface parameters, injection tubing parameters, and annulus parameters.

In some embodiments, injection tubing parameters and surface parameters may be compared to determine various states of the injection system 100. For example, in some embodiments, a pressure head may be determined based on comparing pressure at the surface portion 102 and the sub-surface portion 104 such that a true pressure value is obtained. Further, embodiments are contemplated in which injection control may be adjusted based on comparing the injection tubing parameters and surface parameters. In one example, if the pressure at the injection zone increases above a certain threshold of the surface pressure, a pressure spike of the reservoir may be inferred. Accordingly, the injection flow rate may be automatically reduced to accommodate the sensed pressure spike.

Figure 6:
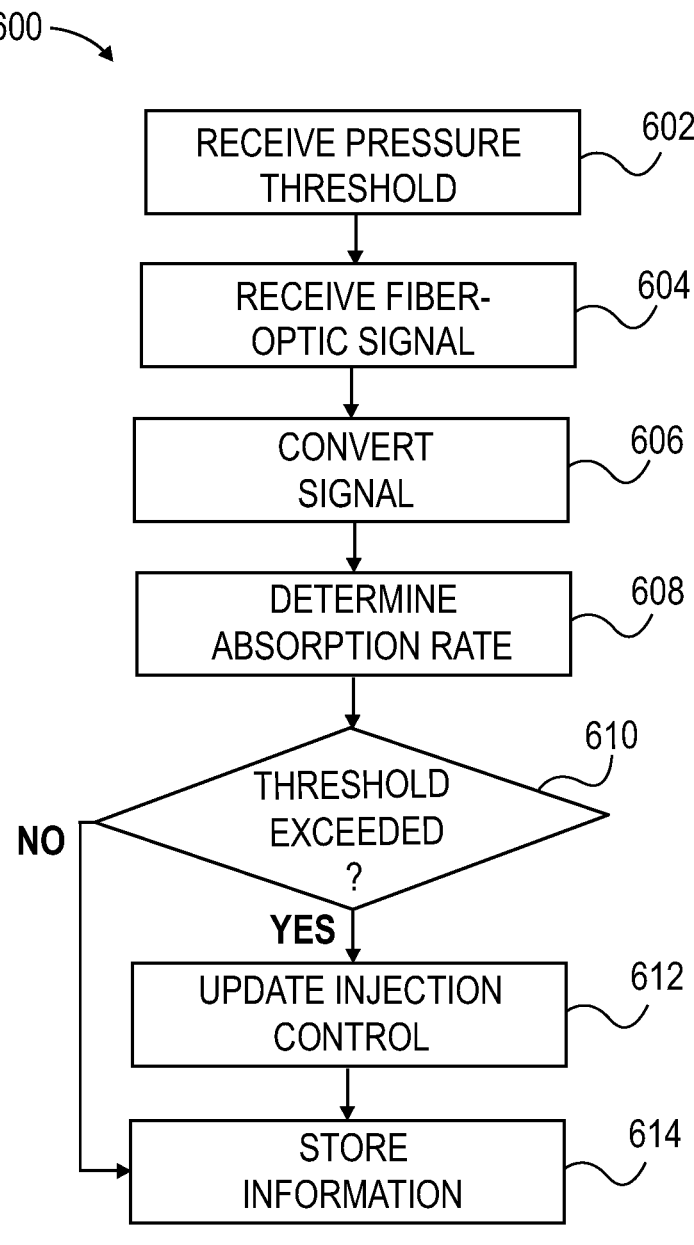
FIG. 6 illustrates an exemplary method of continuous carbon sequestration relating to some embodiments.

FIG. 6 illustrates an exemplary method 600 of continuous carbon sequestration relating to some embodiments. In some embodiments, at least a portion of the steps of the method 600 may be performed automatically, for example, using one or more processors of a controller 202 or other control system of the injection system 100.

At step 602, a predefined pressure threshold is received. The predefined pressure threshold may be associated with a particular sequestration reservoir selected for injection. Accordingly, the predefined pressure threshold may be determined based on one or more reservoir specific parameters. In some embodiments, the predefined pressure threshold is associated with an estimated fracture pressure of the reservoir to ensure that the pressure within the reservoir does not exceed the fracture pressure and leak from the reservoir. In some embodiments, the pressure threshold may be set at or below about 90% of the fracture pressure to ensure that rock and other materials present within and around the sequestration reservoir do not fracture.

At step 604, a fiber-optic signal is received. In some embodiments, the fiber-optic signal is collected by one or more fiber-optic sensors, such as, for example, the fiber-optic sensors 112, or another suitable sensor. For example, in some embodiments, the fiber-optic signal may be indicative of a measured pressure associated with the injection system 100. Additionally, or alternatively, in some embodiments, the fiber-optic signal may be indicative of a measured temperature or another parameter associated with the injection system 100. Further, embodiments are contemplated in which the fiber-optic signal may be indicative of a plurality of parameters of the injection system 100 or multiple separate fiber-optic signals may be received with each fiber-optic signal indicative of a different parameter. In some embodiments, the fiber-optic signal may be transmitted via one or more fiber-optic cables 114 and received by a control device, such as, for example, the controller 202. Alternatively, in some embodiments, the fiber-optic signal may first be received by a converter portion to convert the fiber-optic signal to a form readable by the control device, as described in further detail below.

At step 606, the fiber-optic signal may be converted into a form readable by the controller 202. For example, in some embodiments, the fiber-optic signal may be converted into a digital form such that the controller 202 is able to decipher the fiber-optic signal and obtain information associated with the one or more parameters of the injection system 100.

At step 608, an absorption rate of the geological sequestration reservoir 106 is determined based at least in part on information from the reservoir operating parameters and the fiber-optic signal. In some embodiments, the absorption rate may be indicative of the rate at which carbon dioxide is absorbed into the sequestration reservoir 106. In some such embodiments, the absorption rate may be determined, for example, based on the pressure, temperature, and flow of the carbon dioxide within the injection system, as well as reservoir specific parameters such as, for example, any of the depth, size, and other parameters associated with the geological sequestration reservoir 106.

At step 610, the control system determines whether one or more predetermined thresholds are exceeded based on information within the received fiber-optic signal. In some embodiments, it is determined whether the pressure threshold from step 602 is exceeded based on information indicative of a measured pressure within the fiber-optic signal. Accordingly, if the threshold is exceeded, the method proceeds to step 612. Otherwise, if the threshold is not exceeded, the method proceeds to step 614 without adjusting control of the injection system 100.

At step 612, control of the injection system 100 may be updated or adjusted based at least in part on information from the fiber-optic signal. In some embodiments, updating control of the injection system 100 may include instructing the one or more injection controllers 206 to adjust a power level, activate, or deactivate the one or more pumps 208 or compressors. Further, updating control of the injection system 100 may involve adjusting one or more control valves of the injection system 100 to thereby adjust the flow of the carbon dioxide fluid being injected. Accordingly, the flow rate and pressure of the carbon dioxide in the injection system may be adjusted, for example, to reduce the flow if the predefined pressure threshold is reached or approached. As such, embodiments are contemplated in which the integrated injection control system described herein is operable to provide immediate adjustment to the injection equipment, such as the one or more pumps or compressors 208 of the surface portion 102, based on the received fiber-optic signal. Therefore, the injection system 100 is able to operate continuously without significant down-time because operation of the surface site equipment is adjusted in real-time based on sub-surface parameters. In some embodiments, automatically updating operation of the surface injection equipment allows an optimal injection rate to be selected and adjusted based on the sub-surface parameters detected by the one or more fiber-optic sensing elements disposed on the injection tubing. Accordingly, the injection operation is maintained at a safe and effective rate that avoids downtime and prevents extreme pressure events.

In some embodiments, the adjustment to the injection system 100 may be performed based at least in part on the determined absorption rate. For example, embodiments are contemplated in which a control routine is selected to adjust operation based on a combination of the absorption rate and one or more thresholds being exceeded. As such, the injection flow may be optimized to a level that the reservoir is currently able to safely manage based on the determined absorption rate.

In some embodiments, the updating of the injection control at step 612 may be performed automatically based on determining that a threshold has been exceeded at step 610. For example, if the pressure threshold is exceeded, control of the injection system 100 may be automatically updated to reduce the pressure and/or flow of carbon dioxide into the reservoir 106. Further, it should be understood that embodiments are contemplated in which a plurality of predetermined thresholds are included and injection control may be adjusted based on a particular threshold where each threshold is associated with a respective control operation adjustment.

At step 614, a set of information from the overall injection control system 100 and the fiber-optic signal is stored within a data store, such as, for example, the storage element 204. In some embodiments, the set of information may be stored remotely in addition to, or alternatively to local storage. Accordingly, embodiments are contemplated in which data associated with the fiber-optic signal may be stored redundantly in two or more locations to ensure survival of the data. The set of information may include information indicative of the one or more parameters of the injection system 100. In some such embodiments, the set of information may be augmented with additional data such as time data. For example, a timestamp, injection composition, and one or more rates associated with the injection process may be included with the information such that the parameters may be monitored over time.

Further, embodiments are contemplated in which a historical carbon sequestration database may be generated from the information collected at a given sequestration reservoir. Accordingly, the sequestration reservoir may be monitored over time and may be used as a template or comparison metric for operation of subsequent reservoirs. Embodiments are contemplated in which monitoring of a particular sequestration reservoir continues 50 years after sequestration. Further, embodiments are contemplated in which a reservoir may be monitored up to 100 years post operation.

In one example, the method 600 may be operable to reduce a power level of the one or more pumps or compressors 208 at step 612 responsive to determining that an internal pressure, as measured by the fiber-optic sensor or fiber-optic cable, exceeds a predefined pressure threshold, which may comprise the pressure threshold received at step 602.

In some embodiments, the carbon dioxide sequestered by the injection system 100 may be received from a pretreatment stage. The pretreatment stage may be configured to pretreat the carbon dioxide, for example, to remove contaminates, compress the carbon dioxide, or provide another suitable treatment to the carbon dioxide before supplying the injection system. In some such embodiments, a control portion of the pretreatment stage may be communicatively coupled to the controller 202. Accordingly, bidirectional communication between the controller 202 and the pretreatment stage may be facilitated to inform control of the controller 202 of information from the pretreatment stage and vice versa. For example, when the controller 202 adjusts operation of the injection system 100 the pretreatment stage may be automatically updated to account for the adjustment downstream.

In some embodiments, any number of pretreatment processes may be applied to the carbon dioxide provided to the injection system 100, such as, for example any of a Hydrogen Sulfide removal stage, a dehydration stage, and an acid gas compression stage. Further, embodiments are contemplated in which other pretreatment stages may be included that are not explicitly described herein such that the carbon dioxide is provided to the injection system 100 in a suitable form for sequestration.

In some embodiments, the integrated injection control systems and methods described herein may be further operable to collect seismic data of the sequestration reservoir 106 over time, for example, to monitor the health and viability of the sequestration reservoir 106 and/or to estimate a plume growth of an associated plume of the sequestration reservoir 106.

In some embodiments, the method 600 of continuous carbon injection allows the flow of carbon dioxide into the sequestration reservoir 106 to be moderated, such that the volume of flow is adjusted according to one or more measured pressure parameters or other parameters from the sub-surface portion 104 of the injection system 100. Accordingly, the flow is maintained generally continuously without stopping, and the flow is adjusted to maintain a pressure differential to allow some carbon dioxide to be sequestrated into reservoir 106 for an extended period of time. For example, in some such embodiments, the downtime for which operation is stopped is reduced because the system maintains the ability to continue injection without the need to shut down (e.g., stop injecting carbon dioxide) for adverse pressure conditions. For example, by continuously adjusting the injection pressure to optimize the injection process, cessation of injection of the carbon dioxide for purposes of avoiding overpressurization during injection can be substantially eliminated. In some embodiments, continuous flow may be defined as a flow of carbon dioxide into the reservoir 106 continuing through one or more pressure spikes. It should be understood that the flow may still be altered or reduced to alleviate the pressure, but the flow does not completely stop or is at least not stopped for a large period of time. For example, embodiments are contemplated in which the flow may be temporarily stopped for a short period of time, such as, minutes or hours, before continuing operation. Alternatively, or additionally, the continuous flow may be defined as supplying an amount of carbon dioxide that is at least 99% of the size of the permitted reservoir's capacity over the permitted injection duration of the specific sequestration site, potentially being 1-25 years.

In some embodiments, continuous flow may be defined as continuing flow of the carbon dioxide through the injection system 100 while preventing at least one overpressurization event by reducing the injection pressure and/or flow rate prior to a maximum pressure threshold being reached. Here, the injection pressure and/or flow rate may be adjusted based on one of or any combination of a measured surface pressure, a measured injection pressure, and an estimated absorption rate. As such, embodiments are contemplated in which the injection system 100 operates over extended periods of time while one or more overpressurization events are prevented without completely stopping flow of carbon dioxide.

In some embodiments, a pressure differential is maintained between the surface portion and the injection zone such that the pressure at the surface portion exceeds the pressure within the sequestration reservoir to prevent backflow and facilitate sequestration into the reservoir. However, it should be understood that, in some embodiments, a plurality of check valves and other flow control devices are also used to prevent backflow.

Further, in some embodiments, the flow of carbon dioxide may be adjusted based on the determined absorption rate into the reservoir. As such, the flow may be maintained generally continuously without stopping flow for an extended period of time because the flow can be adjusted and does not exceed a flow rate that can be absorbed into the reservoir. Embodiments are contemplated in which an optimized injection pressure is determined based on the determined absorption rate of the reservoir to thereby prevent overpressurization of the reservoir. As such, the injection pressure may be reduced in correlation with the absorption rate prior to a maximum pressure threshold of the injection zone being reached.

Additionally, embodiments are contemplated in which injection control is automatically updated based on other parameters and calculations. For example, embodiments are contemplated in which injection control is updated based at least in part on a rate of change of a measured internal pressure of the injection system 100. Here, a time derivative of the pressure value from the fiber-optic signal may be taken to determine the rate of change. Further still, embodiments are contemplated in which the injection system 100 and integrated control system are used to sequester other forms of carbon and other substances such as, for example, carbon monoxide, methanol, and various other forms of greenhouse gases and other pollutants.

A1. An injection system for automatically controlling a carbon dioxide injection process, the injection system comprising: a surface portion disposed above-ground comprising: a control system that controls operation of one or more injector pumps; and a sub-surface portion configured to be disposed underground and interfaced with a geological sequestration reservoir such that carbon dioxide is pumped from the surface portion into the geological sequestration reservoir, the sub-surface portion comprising: injection tubing; a plurality of ported connections disposed at a respective plurality of predetermined locations on the injection tubing; and a fiber-optic system comprising: a fiber-optic interrogator communicatively coupled to the control system; a plurality of fiber-optic sensors disposed at one or more of the plurality of ported connections, the plurality of fiber-optic sensors configured to respectively measure a plurality of parameters including an internal pressure and internal temperature of the injection tubing; and one or more fiber-optic cables that transmit at least one signal indicative of the plurality of parameters in real-time to the fiber-optic interrogator, wherein control of the one or more injection devices by the control system is automatically updated in real-time based on the at least one signal such that a continuous flow of the carbon dioxide into the geological sequestration reservoir is maintained.

A2. The injection system of A1, wherein data indicative of the plurality of parameters is stored in an onsite data store in a vicinity of the injection system and a remote data store.

A3. The injection system of any of A1 or A2, wherein at least one of the plurality of fiber-optic sensors is clamped to the injection tubing within an annulus cavity.

A4. The injection system of A1-A3, wherein the control system determines an estimated absorption rate of the geological sequestration reservoir based on the at least one signal and further updates control of the one or more injection devices based on the estimated absorption rate of the geological sequestration reservoir.

A5. The injection system of any of A1-A4, wherein automatically updating control of the one or more injection devices is further based on a predefined pressure threshold associated with the geological sequestration reservoir.

A6. The injection system of any of A1-A5, wherein a power level of the one or more injection devices is reduced responsive to determining that the internal pressure exceeds the predefined pressure threshold.

A7. The injection system of any of A1-A6, wherein the fiber-optic interrogator converts the at least one signal from a fiber-optic form to a digital form such that the at least one signal is readable by the control system.

A8. The injection system of any of A1-A7, wherein the control system comprises an integrated control system directly coupled to the fiber-optic system, and wherein the fiber-optic interrogator is directly coupled to the integrated control system.

B1. A fiber-optic system for automatically controlling a carbon dioxide injection process of an injection system, the fiber-optic system comprising: a fiber-optic interrogator communicatively coupled to a control system of the injection system; a plurality of fiber-optic sensors disposed on injection tubing of the injection system, the plurality of fiber-optic sensors configured to respectively measure a plurality of parameters including an internal pressure and internal temperature of the injection tubing of the injection system; and one or more fiber-optic cables that transmit at least one signal indicative of the plurality of parameters in real-time to the fiber-optic interrogator, wherein control of one or more injection devices of the injection system by the control system is automatically updated in real-time based on the at least one signal such that a continuous flow of carbon dioxide into a geological sequestration reservoir is maintained.

B2. The fiber-optic system of B1, wherein the fiber-optic interrogator is disposed at a surface portion of the injection system, and wherein the plurality of fiber-optic sensors and the one or more fiber-optic cables are disposed at a sub-surface portion of the injection system.

B3. The fiber-optic system of any of B1 or B2, wherein the plurality of fiber-optic sensors are disposed at one or more of a plurality of ported connections of the injection tubing.

B4. The fiber-optic system of any of B1-B3, wherein the plurality of fiber-optic sensors comprises: a first fiber-optic sensor disposed on the injection tubing adjacent to a bottom portion of a wellhead of the injection system; a second fiber-optic sensor disposed on the injection tubing at a mid-section of the injection tubing; a third fiber-optic sensor disposed on the injection tubing adjacent to an injection packer of the injection system; and a fourth fiber-optic sensor disposed on the injection tubing adjacent to the injection zone below an injection packer within the injection system.

B5. The fiber-optic system of any of B1-B4, wherein the plurality of fiber-optic sensors further comprises: a fifth fiber-optic sensor disposed on the injection tubing within an annulus cavity of the injection system.

B6. The fiber-optic system of any of B1-B5, wherein at least one fiber-optic sensor of the plurality of fiber-optic sensors is configured to detect seismic signals associated with the geological sequestration reservoir over a depth of the injection tubing.

B7. The fiber-optic system of any of B1-B6, wherein the seismic signals are used to develop a Vertical Seismic Profile (VSP) of the geological sequestration reservoir.

B8. The fiber-optic system of any of B1-B7, wherein the one or more fiber-optic cables detects an internal temperature of the injection tubing across a length of the one or more fiber-optic cables using a Distributed Temperature Sensing (DTS) technique.

C1. One or more non-transitory computer-readable media that store computer-readable instructions that, when executed by at least one processor, perform a method of continuous carbon dioxide sequestration into a geological sequestration reservoir using an injection system, the method comprising: receiving a predetermined pressure threshold associated with the geological sequestration reservoir; receiving a signal collected by a fiber-optic system disposed at a sub-surface portion of the injection system, the signal including information indicative of an internal pressure of the injection system; determining whether the internal pressure exceeds the predetermined pressure threshold associated with the geological sequestration reservoir; responsive to determining that the internal pressure exceeds the predetermined pressure threshold, automatically updating, in real-time, a control system of the injection system to reduce a flow rate of carbon dioxide within the injection system; and storing the information indicative of the internal pressure in at least one data store.

C2. The one or more non-transitory computer-readable media of C1, the method further comprising: determining an absorption rate of the geological sequestration reservoir based at least in part on the information indicative of the internal pressure of the injection system.

C3. The one or more non-transitory computer-readable media of any of C1 or C2, the method further comprising: receiving a subsequent signal collected by a fiber-optic system disposed at a sub-surface portion of the injection system, the subsequent signal including information indicative of an internal temperature of the injection system.

C4. one or more non-transitory computer-readable media of any of C1-C3, wherein the control system of the injection system is further updated based at least in part on the information indicative of the internal temperature of the injection system.

C5. one or more non-transitory computer-readable media of any of C1-C4, the method further comprising: receiving a subsequent signal from a sensor disposed at a surface portion of the injection system, the subsequent signal including information indicative of a surface pressure of the injection system; and comparing internal pressure of the injection system to the surface pressure of the injection system.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An injection system for automatically controlling a carbon dioxide injection process, the injection system comprising:
   a surface portion disposed above-ground comprising:
   a control system that controls operation of one or more injection devices; and
   a sub-surface portion configured to be disposed underground and interfaced with a geological sequestration reservoir such that carbon dioxide is pumped from the surface portion into the geological sequestration reservoir, the sub-surface portion comprising:
   injection tubing;
   a plurality of ported connections disposed at a respective plurality of predetermined locations on the injection tubing; and
   a fiber-optic system comprising:
      a fiber-optic interrogator coupled to the control system;
      a plurality of fiber-optic sensors disposed at one or more of the plurality of ported connections, the plurality of fiber-optic sensors configured to respectively measure a plurality of parameters including an internal pressure and internal temperature of the injection tubing; and
      one or more fiber-optic cables that transmit parameter data indicative of the plurality of parameters in real-time to the fiber-optic interrogator,
   wherein the control system is configured to:
      obtain the parameter data from the one or more fiber-optic cables;
      compare the parameter data to a plurality of thresholds, wherein each successive threshold of the plurality of thresholds is indicative of a less safe operating range of the geological sequestration reservoir; and
      controlling the one or more injection devices based on each successive threshold to maintain continuous flow of the carbon dioxide into the geological sequestration reservoir.

2. The injection system of claim 1, wherein data indicative of the plurality of parameters is stored in an onsite data store in a vicinity of the injection system and a remote data store.

3. The injection system of claim 1,
   wherein at least one of the plurality of fiber-optic sensors is disposed in an annulus cavity and is configured to detect annulus parameters, and
   wherein the control system is further configured to:
      compare the annulus parameters to the parameter data; and
      control the one or more injection devices based on the comparison.

4. The injection system of claim 1, wherein the control system determines an estimated absorption rate of the geological sequestration reservoir based on the parameter data and further updates control of the one or more injection devices based on the estimated absorption rate of the geological sequestration reservoir.

5. The injection system of claim 1, wherein automatically updating control of the one or more injection devices is further based on a predefined pressure threshold associated with the geological sequestration reservoir.

6. The injection system of claim 5, wherein a power level of the one or more injection devices is reduced responsive to determining that the internal pressure exceeds the predefined pressure threshold.

7. The injection system of claim 1, wherein the control system comprises an integrated control system directly coupled to the fiber-optic system, and wherein the fiber-optic interrogator is directly coupled to the integrated control system.

8. A fiber-optic system for automatically controlling a carbon dioxide injection process of an injection system, the fiber-optic system comprising:
   a fiber-optic interrogator coupled to a control system of the injection system;
   a plurality of fiber-optic sensors disposed on injection tubing of the injection system, the plurality of fiber-optic sensors configured to respectively measure a plurality of parameters including an internal pressure and an internal temperature of the injection tubing of the injection system; and
   one or more fiber-optic cables that transmit parameter data indicative of the plurality of parameters in real-time to the fiber-optic interrogator; and
   wherein the control system is configured to:
      obtain the parameter data from the one or more fiber-optic cables;
      compare the parameter data to a plurality of thresholds, wherein each successive threshold of the plurality of thresholds is indicative of a less safe operating range; and
      controlling one or more injection devices based on each successive threshold to maintain continuous flow of carbon dioxide.

9. The fiber-optic system of claim 8, wherein the fiber-optic interrogator is disposed at a surface portion of the injection system, and wherein the plurality of fiber-optic sensors and the one or more fiber-optic cables are disposed at a sub-surface portion of the injection system.

10. The fiber-optic system of claim 8, wherein the plurality of fiber-optic sensors are disposed at one or more of a plurality of ported connections of the injection tubing.

11. The fiber-optic system of claim 8, wherein the plurality of fiber-optic sensors comprises:

a first fiber-optic sensor disposed on the injection tubing adjacent to a bottom portion of a wellhead of the injection system;

a second fiber-optic sensor disposed on the injection tubing at a mid-section of the injection tubing;

a third fiber-optic sensor disposed on the injection tubing adjacent to an injection packer of the injection system; and a fourth fiber-optic sensor disposed on the injection tubing adjacent to an injection zone within the injection system.

12. The fiber-optic system of claim 11, wherein the plurality of fiber-optic sensors further comprises:

a fifth fiber-optic sensor disposed on the injection tubing within an annulus cavity of the injection system.

13. The fiber-optic system of claim 8, wherein at least one fiber-optic sensor of the plurality of fiber-optic sensors is configured to detect seismic signals associated with a geological sequestration reservoir over a depth of the injection tubing.

14. The fiber-optic system of claim 8, wherein the fiber-optic interrogator is directly coupled to the control system.

15. The fiber-optic system of claim 8, wherein one or more fiber-optic sensors of the plurality of fiber-optic sensors detects the internal temperature of the injection tubing across a length of the one or more fiber-optic cables using a Distributed Temperature Sensing (DTS) technique.

16. An injection system for automatically controlling a carbon dioxide injection process, the injection system comprising:

a surface portion disposed above-ground comprising:

a control system that controls operation of one or more injection devices; and a sub-surface portion configured to be disposed underground and interfaced with a geological sequestration reservoir such that carbon dioxide is pumped from the surface portion into the geological sequestration reservoir, the sub-surface portion comprising:

injection tubing;

a plurality of ported connections disposed at a respective plurality of predetermined locations on the injection tubing; and a fiber-optic system comprising:

a fiber-optic interrogator coupled to the control system;

a plurality of fiber-optic sensors disposed at one or more of the plurality of ported connections, the plurality of fiber-optic sensors configured to respectively measure a plurality of parameters including an internal pressure and internal temperature of the injection tubing; and one or more fiber-optic cables that transmit parameter data indicative of the plurality of parameters in real-time to the fiber-optic interrogator, wherein the control system performs a method of continuous carbon dioxide sequestration into the geological sequestration reservoir, the method comprising:

receiving a plurality of predetermined pressure thresholds associated with the geological sequestration reservoir;

receiving the parameter data collected by the plurality of fiber-optic sensors of the fiber-optic system, the parameter data including information indicative of the internal pressure of the injection system;

determining that the internal pressure exceeds a predetermined pressure threshold of the plurality of predetermined pressure thresholds associated with the geological sequestration reservoir;

responsive to determining that the internal pressure exceeds the predetermined pressure threshold, automatically updating, in real-time, the control system to reduce a flow rate of the carbon dioxide by a minimum amount within the injection system; and storing the information indicative of the internal pressure in at least one data store.

17. The injection system of claim 16, the method further comprising:

determining an absorption rate of the geological sequestration reservoir based at least in part on the information indicative of the internal pressure of the injection system.

18. The injection system of claim 16, the method further comprising:

obtaining annulus parameters from an annulus fiber-optic sensor disposed in an annulus cavity;

comparing the annulus parameters to the parameter data; and controlling the one or more injection devices based on the comparison.

19. The injection system of claim 18, wherein the predetermined pressure threshold is a first threshold, and wherein the control system of the injection system is further updated based at least in part on a second threshold indicative of a less safe condition than the first threshold.

20. The injection system of claim 16, the method further comprising:

receiving surface data from a sensor disposed at the surface portion of the injection system, the surface data including information indicative of a surface pressure of the injection system; and comparing the internal pressure of the injection system to the surface pressure of the injection system.

* * * * *